Patented June 28, 1938

2,121,810

UNITED STATES PATENT OFFICE 2,121,810

CORK COMPOSITION AND METHOD OF MAKING SAME

Charles E. McManus, Spring Lake, N. J., assignor to Crown Cork & Seal Company, Inc., Baltimore, Md., a corporation of New York No Drawing. Application September 14, 1934, Serial No. 744,097. Renewed July 30, 1937

8 Claims. (Cl. 106—22)

The present invention relates to cork composition and method of making same. By cork composition is meant a composite cork structure formed predominantly of cork granules in closely compacted relation and which are held together by a binder. Such cork composition is prepared in the form of blocks, cylinders, sheets and in various shapes of either final commercial state or in form suitable for fabricating operations.

It is an important feature of the present invention that the cork composition may be manufactured into the particular form or product by molding, extruding, packing, rolling or sheeting. This is made possible by coating the granules with a binder which, in its unset or unhardened condition, does not interfere with the free flowing of the binder coated cork. Thus, the binder coated cork in contradistinction to a sticky agglomerate may be fed or piped in predetermined amounts, intermittently or continuously, from a suitable storage receptacle or from a hopper to the forming instrumentality.

The cork composition of the present invention possesses a light color comparable to natural cork and is characterized by possessing a maximum of cork properties. That is to say, the cork does not lose its identity and the product possesses enhanced compressibility and rebound. Also, the cork composition of this invention is resilient, flexible and elastic.

Cork composition is used in a variety of applications and is subjected to varying temperature conditions, moisture and not infrequently to chemical action. The present cork composition meets these requirements and is also acid and alkali resistant, resistant to mold growth, free of odor or odor contamination, does not shrink or curl and possesses a long life.

In addition to the various characteristics alluded to, the cork composition of this invention does not impart objectionable taste to food products as when the same is used as a cushion liner for sealing caps nor does the cork composition react with the lacquers or other coatings associated with the metal cap. The composition is preferably devoid of free glycol which, I have found, tends to attack varnishes and lacquers and impart taste to beverages when used in cushion liners for closure caps. Again, the binder is compatible with various adhesives which are used in the case of so-called spot caps for adhering the foil or paper spot to the cork composition.

In the manufacture of cork composition the margin of profit is small and any reduction in production costs is of substantial advantage. The present cork composition may be formed in an economic time cycle; that is, the several operations including the making up of the binder, mixing with the cork, forming to shape and setting the binder to produce the final article are capable of accomplishment in a relatively short time period and with automatic apparatus.

The cork composition of this invention comprises a binder, in which are used tung oil prepared in a manner to be later described, a resin, preferably a synthetic resin, and a solvent and cork plasticizer, e. g., glycerine and in some cases, a wax. The binder is characterized by the absence of a glue adhesive and of free glycol, the latter tending to attack lacquers and impart taste to beverages.

In the manufacture of a cork composition comprising a binder of this composition, there is employed a bodied tung oil. This is produced by taking tung oil or China wood oil and subjecting the same to a temperature of substantially 450° to 500° F. in an open kettle for about one hour. Thereafter, the bodied product is preferably cooled to about 450° F. This treatment imparts to the tung oil a body or concentration which I find particularly useful in the manufacture of the binder. The tung oil is heated until it reaches a bodied state and particular care is exercized not to carry the treatment further. In other words, the heating is checked when the oil becomes bodied and has the characteristic of a varnish maker's string.

Into a jacketed kettle or other suitable apparatus, there is placed a suitable amount of glycerine into which is flowed slowly and agitated the bodied tung oil which is dispersed in the polybasic alcohol. The temperature of this mixture, either by preliminarily reducing the temperature of the tung oil or reducing the temperature of the mixture thereof with glycerine, should not be substantially above 180° F. to 200° F.

The tung oil glycerine dispersion prepared as described is drawn off and cooled to a temperature of about 140° to 160° F. for admixture with the resin component.

There is then added to the dispersion by way of example, a phenol formaldehyde condensation product prepared in the following manner.

A suitable mixture of phenol and formaldehyde solution together with oxalic acid, previously dissolved in enough water to form a solution, are mixed in a suitable vessel and heated slowly, preferably by means of steam until reaction starts. The steam is then shut off and the mixture is allowed to react for approximately twenty minutes in the heated vessel. Thereupon, cold water is run into the reaction product to cool the same and stop the reaction. The mass is permitted to settle for about forty-five minutes to one hour, so that the resin precipitates. The water is now siphoned off and the resin is subsequently given several, i. e., about four, separate washes with water at a temperature of about 120° F. to remove the oxalic acid. In each case, the mass is permitted to settle for about twenty minutes to one-half hour and the water removed. The final product is now boiled under vacuum until the reaction product becomes clear, and substantially all remaining water is removed, and until the resin presents a viscous character having substantially the viscosity of a string. The resin is now preferably, but not necessarily, dissolved in a suitable cork plasticizer, for example, glycerine, and is ready for admixture with the tung oil dispersion. Glycol or sulphonated castor oil may be used, but the cork composition is unsatisfactory for beverage purposes. The resin is in a partially cured state, and is preferably at a temperature of about 140° F. for admixture with the tung oil dispersion.

The tung oil dispersion at about 140° F. and the resin at substantially the same temperature are now mixed and constitute the binder for the comminuted cork. As stated, the temperature is controlled to prevent premature reaction of the resin and the mixture is preferably kept at about or below 150° F.

It is important to keep the temperature of the mixture low enough, about 140° F., to prevent any premature hardening or setting of the partially reacted resin or reaction between the tung oil and resin.

In some cases, the mixture is thinned with a solvent diluent such as grain alcohol, so that the binder will have a viscosity of substantially 165 seconds at 70° F. Glycol may be used, but the cork composition is not satisfactory for beverage purposes.

The binder mixture is stable at the temperature of 150° F. or below so that it can be made up in large quantities and stored.

Just prior to mixing the binder with the comminuted cork, a hardener for the resin such as hexamethylenetetramine, formaldehyde or paraformaldehyde is added to the mixture. In the present instance, hexamethylenetetramine is used as the hardening agent and I make, for example, a solution consisting of one part hexamethylenetetramine and one and one-half parts water.

The hardening agent is mixed with the binder at below substantially 160° F. and the binder solution is mixed for about thirty seconds with the comminuted cork in any suitable type of mixing machine. The cork granules are coated with this binder solution and immediately passed to a suitable mold or other forming instrumentality. The time period is important, in that it is necessary that the binder coated cork be supplied to the forming instrumentality before the hardening agent becomes effective to harden the resin.

As a modification of this procedure, the binder coated granulated cork, after mixing with the hardening agent, is passed to a chilling room. That is, the binder solution, including the hardening agent, is subjected to a thirty second mixing with the comminuted cork and thereafter immediately stored in bins or hoppers at a temperature of 40° F. The chilling room has substantially no humidity as tested by the wet bulb and is maintained cold by means of air washed and chilled at a low temperature. The storage of the binder coated comminuted cork at a low temperature will prevent any substantial hardening of the resin and it will be fed as required to the forming instrumentality.

In either case, the granules coated with a thin binder film will be free flowing, so that the apparatus will not be clogged. Moreover, the cork will be uniformly distributed, assuring a dense and uniformly compacted cork composition.

After the binder coated cork has been formed, the mold or other means is preferably passed for about two hours through a travelling oven heated to a temperature of substantially 290° F. to 300° F., whence the binder is set and dried. It is desirable not to go above 320° F. in the oven in order to avoid any possibility of charring the cork. After passage through the oven, the cork composition is cooled and removed from the forming means. This forming means may be a block mold, a cylinder mold, a sheet mold, a packing tube, or a rolling mill and articles of any desired size and shape will be produced.

In the manufacture of a cork composition in accordance with the above process, I use substantially 150 parts of the resin, 50 parts of the bodied tung oil solution and substantially 5% more or less of the hardening agent. Substantially three pounds of the binder mixture at below substantially 160° F. will be mixed with about twelve to thirteen pounds of cork for forming the cork composition. These proportions are exemplary and will be substantially followed in large or bulk production.

The binder coated cork with or without the hardening agent, as stated, will be free flowing as distinguished from a sticky agglomerate. The step of forming may immediately follow the mixing operation or the binder coated cork may be stored and used as required. Throughout the operation, temperatures will be controlled so as to prevent any objectionable action upon the resin whereby it retains its maximum adhesiveness.

The use of a polybasic or polyhydric alcohol solvent has the further important function of providing a cork plasticizer i. e. cork softener, thereby enhancing the flexibility, elasticity and life of the cork composition.

In referring to bodied tung oil, is meant a flowable concentrated body having a viscosity analogous to a string as understood in the varnish maker's art. Such oil is to be distinguished not only from ordinary or raw tung oil, but also from pre-solidified or gelled tung oil, such as is used in the linoleum industry.

The cork composition possesses a light color comparable to natural cork, a high tensile strength and is characterized by flexibility and a high degree of compressibility and rebound. This resilience of the cork composition is enhanced by the binder and, as heretofore stated, the cork properties are present in the cork composition in which the cork predominates by volume.

Instead of glycerine, I will use any suitable dispersing agent for the tung oil and preferably one which is the equivalent of glycerine in that it has the additional function of being a cork plasticizer and thereby adding to the resiliency, flexibility, elasticity and life of the product, e. g., sulphonated castor oil. I prefer a dispersing agent which will not attack the lacquer of closure caps or impart taste or odor and for this reason prefer glycerine to glycol or sulphonated castor oil.

It is an important feature of the cork composition of this invention that it is highly resistant to acids, so that the cork composition may be utilized substantially with all types of beverages and bottled food products. I find that the bodied tung oil has the property of protecting the binder against said reactions.

The tung oil moreover, is stable and completely overcomes any tendency either of shrinkage or expansion of the cork composition.

The binder will not react with the lacquers employed as a coating for metal caps and hence, there is no opportunity for disintegration or breaking down of such coatings. In the same manner, the binder is inert and does not attack the adhesives frequently used in the case of spot caps for adhering the metal or paper spot to the cork composition.

The cork composition is free of brittleness and is hygroscopic insuring continuous flexibility. It is moreover, acid and alkali resistant, repugnant to mold growth, and resistant to heat and cold under high pressures, and moisture resistant. Moreover, the cork composition is free of odor and objectionable taste.

Further, the presence of the tung oil accelerates the action of the hexamethylenetetramine in curing the resin.

The tung oil, in addition, has the effect of absorbing any phenol odor. It appears that the free phenol and formaldehyde react with the tung oil forming a non-odorous reaction product adding to the tenacity and resistance of the binder.

This reaction product forms on the cork particles as a tough film comparable to a varnish gum which is non-hygroscopic and is stable in the air. The cork composition is free of shrinkage or expansion and this stability appears directly attributable to the stabilizing influence of the tung oil.

The cork composition being free of glycol is particularly useful as a sealing liner material in association with caps for all types of food products, drugs and chemicals.

As a further example of a resin tung oil binder, and instead of using a single condensation product, a mixture or combination of condensation products is employed. The binder is prepared in the following manner.

A tung oil dispersion is prepared, as previously described, and drawn off at a temperature of substantially 160° F. There is then added to it a binder mixture of phenol formaldehyde resin and urea formaldehyde resin in a suitable plasticizer solvent, e. g., glycerine, prepared in accordance with the applications of Andrew Weisenburg, Serial No. 497,615, Serial No. 497,616 and Serial No. 675,636.

The resin or resin solution in a partially cured state and at a temperature of substantially 140° F. is added to the tung oil dispersion which is at substantially 160° F. It is important to keep the tung oil dispersion and the resin solution at temperatures low enough to prevent any premature reaction between the two or premature hardening of the resin. Thereafter, the binder formed of the mixture of tung oil dispersion and synthetic resin solution is mixed with a suitable hardener or accelerator for the resin, such as hexamethylenetetramine, oxalic acid or other organic acids as described in said Weisenburg applications or sulphuric acid. Preferably, the acid hardening agents are introduced in solution in a cork plasticizer solvent, such as glycerine, formed of equal parts of agent and solvent. Glycol and sulphonated castor oil may be used where the cork composition is not employed for beverage purposes.

The binder is then mixed with the cork and the cork composition is formed immediately or stored as heretofore described.

In preparing the cork composition, the ratio of resin to tung oil dispersion is substantially similar to that described and the hardening agent is added in substantially the same percentage. The binder is incorporated with the cork in the ratio of about three pounds of binder to twelve or thirteen pounds of cork, as described, this being simply by way of example and substantially followed in commercial production.

The cork composition product has all of the advantageous characteristics, properties and uses of the cork composition heretofore described. The superior results secured by using a tung oil phenol condensation product binder, as above described, are present with the cork composition using a mixed resin binder and the product is particularly useful as a sealing liner material for container caps.

In addition to the resins mentioned, I use other synthetic resins such as cumarons or alkyd resins and the processes mentioned are substantially followed when these resins are used. Preferably, the resins are likewise incorporated in a suitable solvent or cork plasticizer in a partially or semi-cured state for incorporation in the binder.

In referring to the Weisenburg applications, it will be understood that there is used any of the resins as well as mixtures of resins and proteins therein described. The various resins and resin mixtures set forth in the Weisenburg applications and equivalents, all of which are utilized in forming the resin binder of this invention, have not been specifically recited in this application in order that the specification may not be unduly prolix.

The binder coated cork is free flowing, and it is to be noted that the resin, as well as the glue, is cured or set in the presence of the cork.

I have referred herein to the use of a thinner for the binder mixture which I find in some cases is quite desirable and for this purpose a small percentage of grain alcohol or other solvent diluent is used to bring the viscosity of the respective binder compositions to a viscosity of about 165 seconds at 70° F. Glycol may be used, but the cork composition is not satisfactory for beverage purposes. The thinner will be used with each of the binder mixtures described, as well as with their equivalents when necessary.

In connection with the use of a mixed resin of the type of the Weisenburg applications, it is possible to effect curing of the synthetic resin under a temperature of substantially 280° with the pressure utilized in carrying out the molding or forming operation. The temperatures of the oven may vary slightly and the time period of about two hours may be changed, depending upon the type of resin employed and the particular hardening agent.

I have referred herein to the use in some cases of a binder including a wax. This wax may be added to the tung oil dispersion before mixing with the resin or to the resin binder before mixing with the tung oil dispersion as well as to the tung oil resin mixture and is added in melted condition. This wax will have the required melting and hardening point for the intended cork composition and is of vegetable, animal or mineral origin. Paraffin, carnauba, beeswax, white and yellow wax, are examples of those employed. In the case of beverage cap liners, the wax will preferably be one imparting neither taste nor odor to the cork composition. Again, the melting point of the wax will be selected in accordance with the use of the cork composition, i. e., the degree of heating to which the cork composition will be subjected. The wax in fluid condition will readily mix in most cases with the several binders and performs the function of a lubricant for the cork composition. This property is particularly true where the cork composition is extruded, the lubricant very materially aiding in the extruding operation, and is also assistive in the ordinary molding operation to overcome any possibility of sticking of the cork composition. Only a small percentage of wax is added to the binder, preferably an amount to exert in the particular cork composition a lubricating function. The wax as will be appreciated also has a binding action, stabilizes the cork composition and enhances its chemical resistance and waterproofing.

When the wax employed is not readily miscible with the binder, a suitable wax carrier may be employed as understood in the art, e. g. a latex or rubber mixture will be used.

The cork composition in any of the embodiments described consists of the cork which predominates by volume, and the binder; the binder is provided in a thin film upon the cork particles and the mixture compressed and compacted into various forms, the binder being cured either during the forming operation or subsequent thereto. That is to say, while I have referred to forming and then curing the mix in a travelling oven with the cork composition confined in the forming instrumentality, the cork composition, where being extruded into rods or other shapes, will have the binder simultaneously cured concomitantly with the extruding operation, e. g., in the extrusion tube.

While synthetic resins have been mentioned as preferred, natural resins are in a number of cases useful in lieu thereof. Thus resins such as the dammars, and copals are employed. Mixtures of natural and synthetic resins sometimes are used.

While I have referred herein to the absence of glycol, I wish it understood that glycol (di- or tri-ethylene glycol) and sulphonated castor oil are employed in lieu of glycerine wherever taste and odor imparting properties are not important.

With further reference to the cork compositions herein referred to comprising comminuted cork, resin and tung oil, I find that a cork composition including a urea resin or a "Glyptal" or alkyd resin is very satisfactory in the manufacture of cushion liner material for caps used in the beverage, food, drug and general chemical field. For example, I make a cork composition consisting of urea resin and tung oil or alkyd resin and tung oil. In some cases, the resins are combined to form a comminuted cork, tung oil, urea resin and alkyd resin cork composition.

There is added to such resin tung oil binders, in some cases, a wax, as above described. Also, I combine with such alkyd or urea resin binders a glue or gelatin gel which preferably includes glycerine although glycol in some instances may be used.

The various cork compositions herein described are useful for the manufacture of gaskets, window channels, bottle cap liners, and in all of the various applications in which cork composition is now utilized. The cork composition is particularly useful in the bottle cap art, since it does not include glycol or any other agent which tends to attack lacquers and varnishes. Therefore, it does not impart taste to beverages or other liquids.

I claim:

1. A cork composition comprising cork granules, and bodied tung oil and a resin in amount to constitute a binder therefor, said comminuted cork predominating by volume.

2. A cork composition comprising cork granules, bodied tung oil and a resin in amount to constitute a binder therefor, and a cork softener and plasticizer, said comminuted cork predominating by volume.

3. A cork composition comprising cork granules, bodied tung oil and a resin in amount to constitute a binder therefor, and a hardening agent for said resin, said comminuted cork predominating by volume.

4. A cork composition comprising cork granules, bodied tung oil and a resin in amount to constitute a binder therefor, a cork softener and plasticizer, and a hardening agent for said resin, said comminuted cork predominating by volume.

5. A free flowing composition of matter comprising cork granules coated with a binder comprising bodied tung oil and a resin, said binder being in a non-tacky state.

6. The process of making a cork composition, comprising heating tung oil to change its chemical structure and viscosity to the point where it has substantially the consistency of a varnish maker's string, mixing the bodied tung oil with a cork softener, including in the mixture a synthetic resin in a partially cured state, including a hardening agent for the resin, coating the mixture upon a mass of cork granules, and molding the binder coated cork granules.

7. The process of making a cork composition, comprising heating tung oil to change its chemical structure and viscosity to the point where it has substantially the consistency of a varnish maker's string, mixing the bodied tung oil with a cork softener, including in the mixture a synthetic resin in a partially cured state, including a hardening agent for the resin, coating the mixture upon a mass of cork granules, and maintaining the binder coated cork in an atmosphere having a relatively low temperature and humidity for preventing hardening of the resin and for retaining the binder on the cork granules in substantially a non-tacky state.

8. A cork composition comprising cork granules, bodied tung oil and a resin in amount to constitute a binder therefor, and a wax, said comminuted cork predominating by volume.

CHARLES E. McMANUS.